United States Patent [19]

Menard

[11] 4,142,489
[45] Mar. 6, 1979

[54] ELECTRONIC ARRANGEMENT FOR CONTROLLING THE IGNITION OF AN INTERNAL COMBUSTION ENGINE

[75] Inventor: Christian Menard, Velizy-Villacoublay, France

[73] Assignee: Thomson-CSF, Paris, France

[21] Appl. No.: 729,870

[22] Filed: Oct. 5, 1976

[30] Foreign Application Priority Data

Oct. 9, 1975 [FR] France ............................ 75 30894
Jul. 27, 1976 [FR] France ............................ 76 22835

[51] Int. Cl.$^2$ ........................................... F02P 5/04
[52] U.S. Cl. ............................................. 123/117 R
[58] Field of Search ....... 123/117 R, 117 D, 179 BG, 123/146.5 A

[56] References Cited

U.S. PATENT DOCUMENTS

| | | | |
|---|---|---|---|
| 3,756,212 | 9/1973 | Schirmer et al. ............. | 123/117 R |
| 3,910,243 | 10/1975 | Gau et al. ...................... | 123/117 R |
| 4,044,733 | 8/1977 | Suda ............................... | 123/117 R |

*Primary Examiner*—Charles T. Jordan
*Attorney, Agent, or Firm*—Roland Plottel

[57] ABSTRACT

An electronic control for an internal combustion engine, and for precisely controlling the instant at which the ignition sparks are emitted. It is fitted with an electronic contact breaker and with sensors for measuring physical parameters characteristic of the conditions under which the engine is operating. This control comprises two channels whose operation is mutually exclusive, namely a first channel which operates when the engine is started and is idling, and a second channel which operates when the engine is running at high speed and under load.

The control is applicable to electronic ignition systems for internal combustion engines with controlled emission.

5 Claims, 11 Drawing Figures

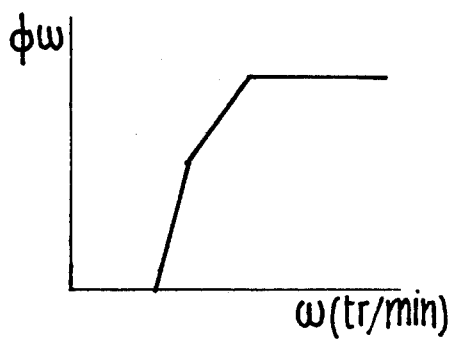
FIG_4
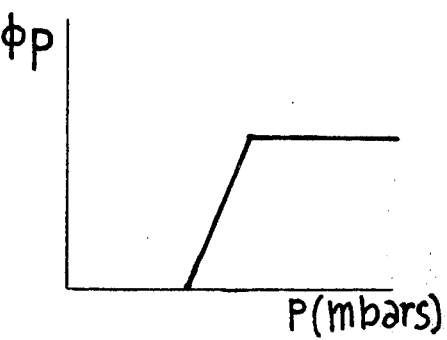
FIG_5
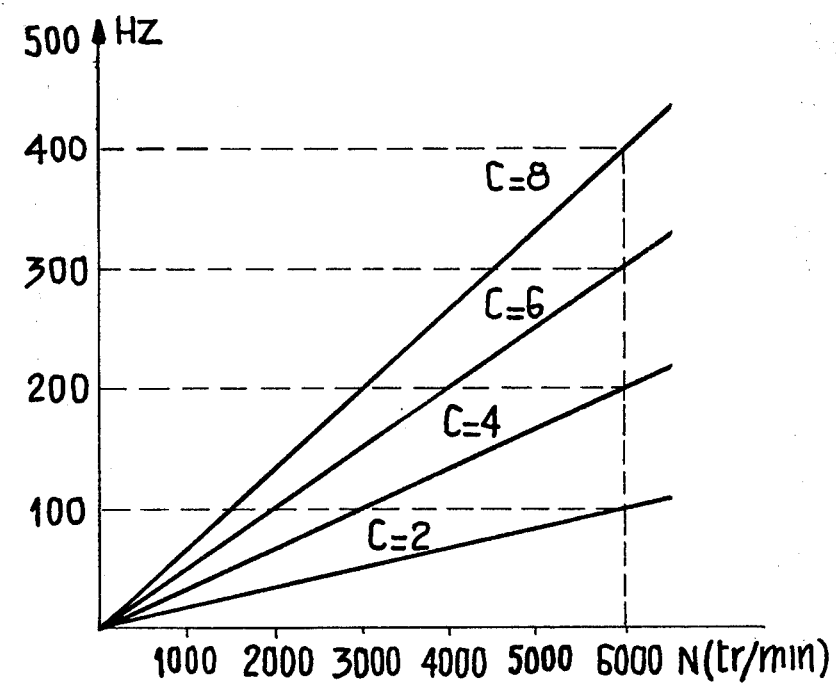
FIG_1

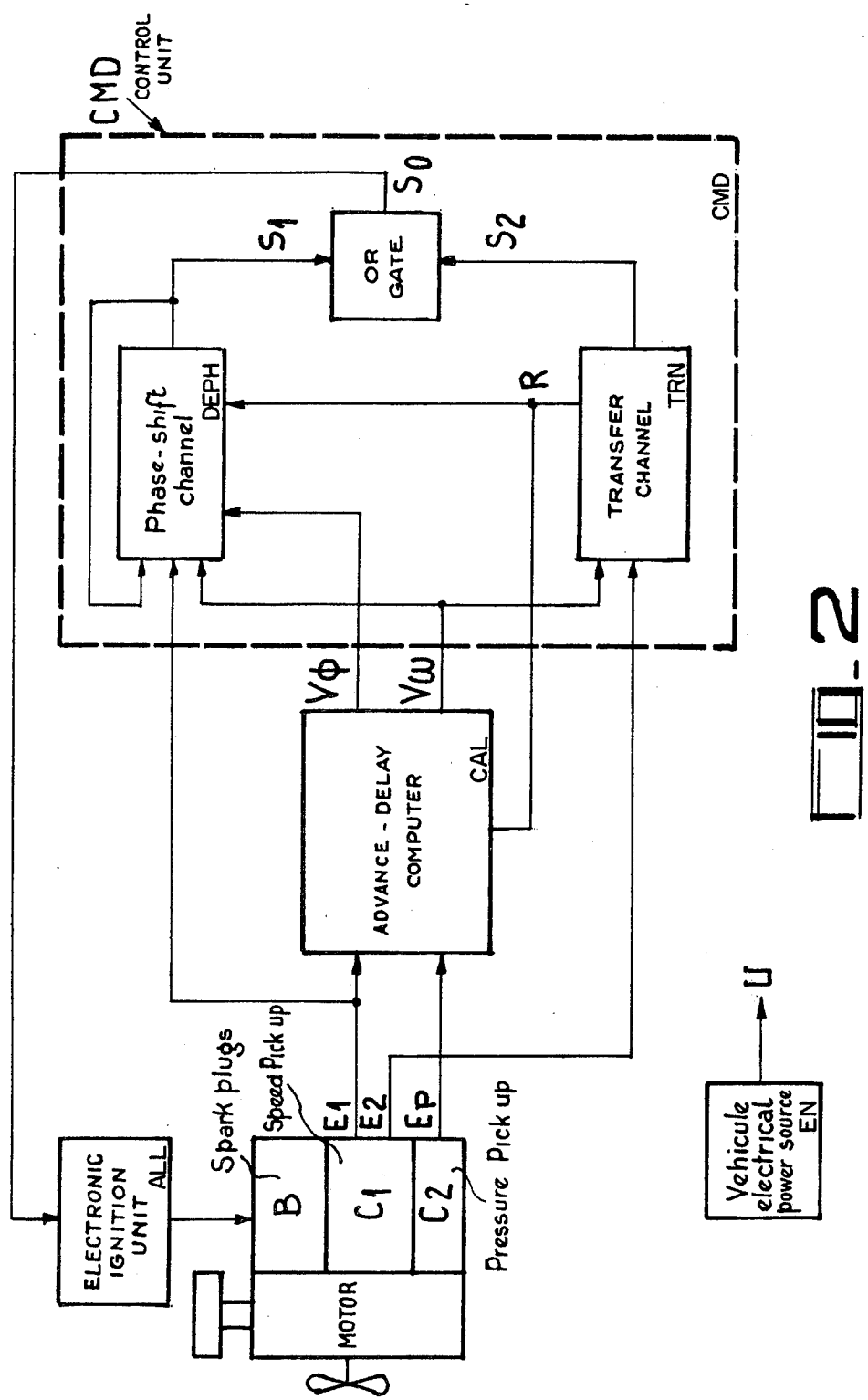

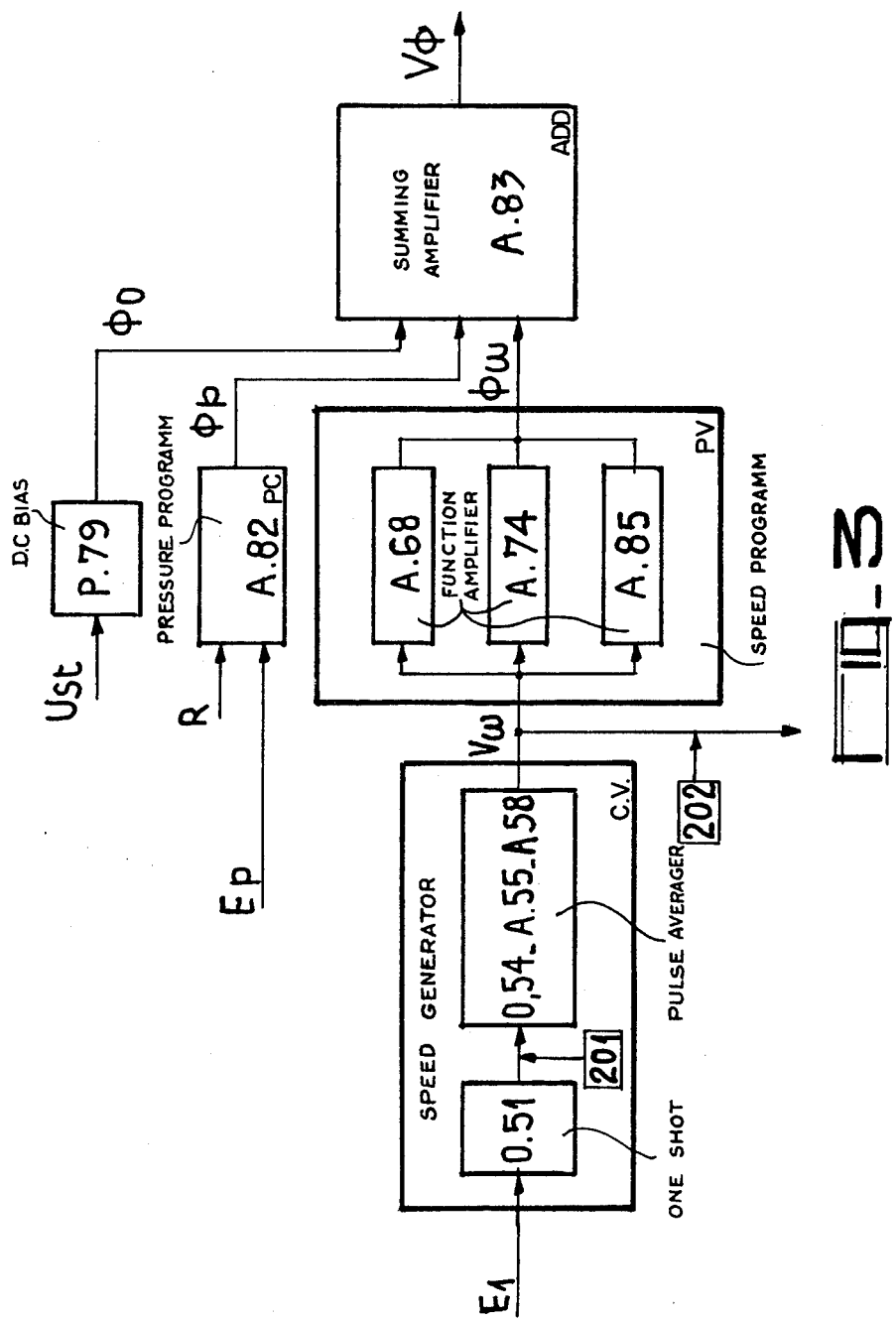

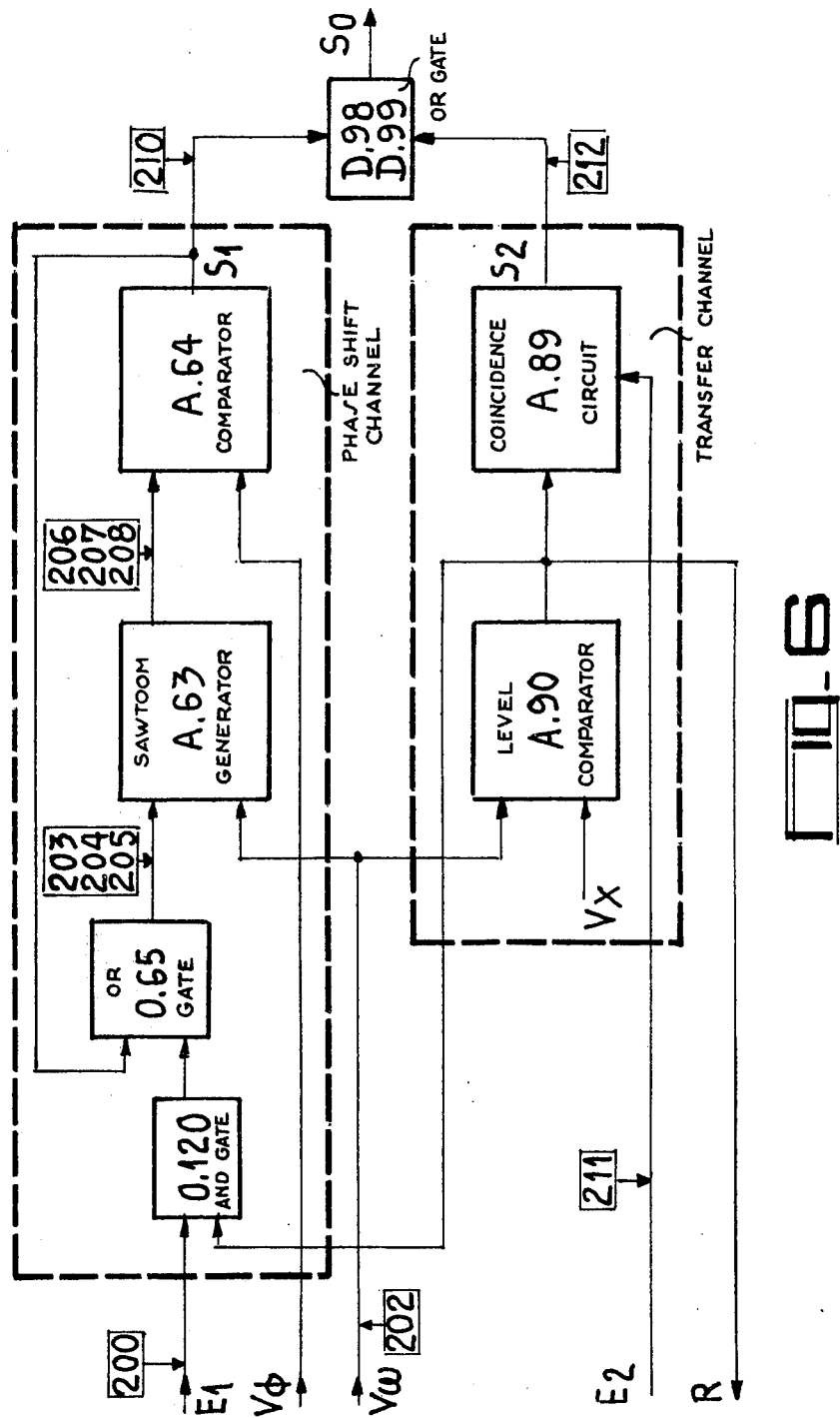

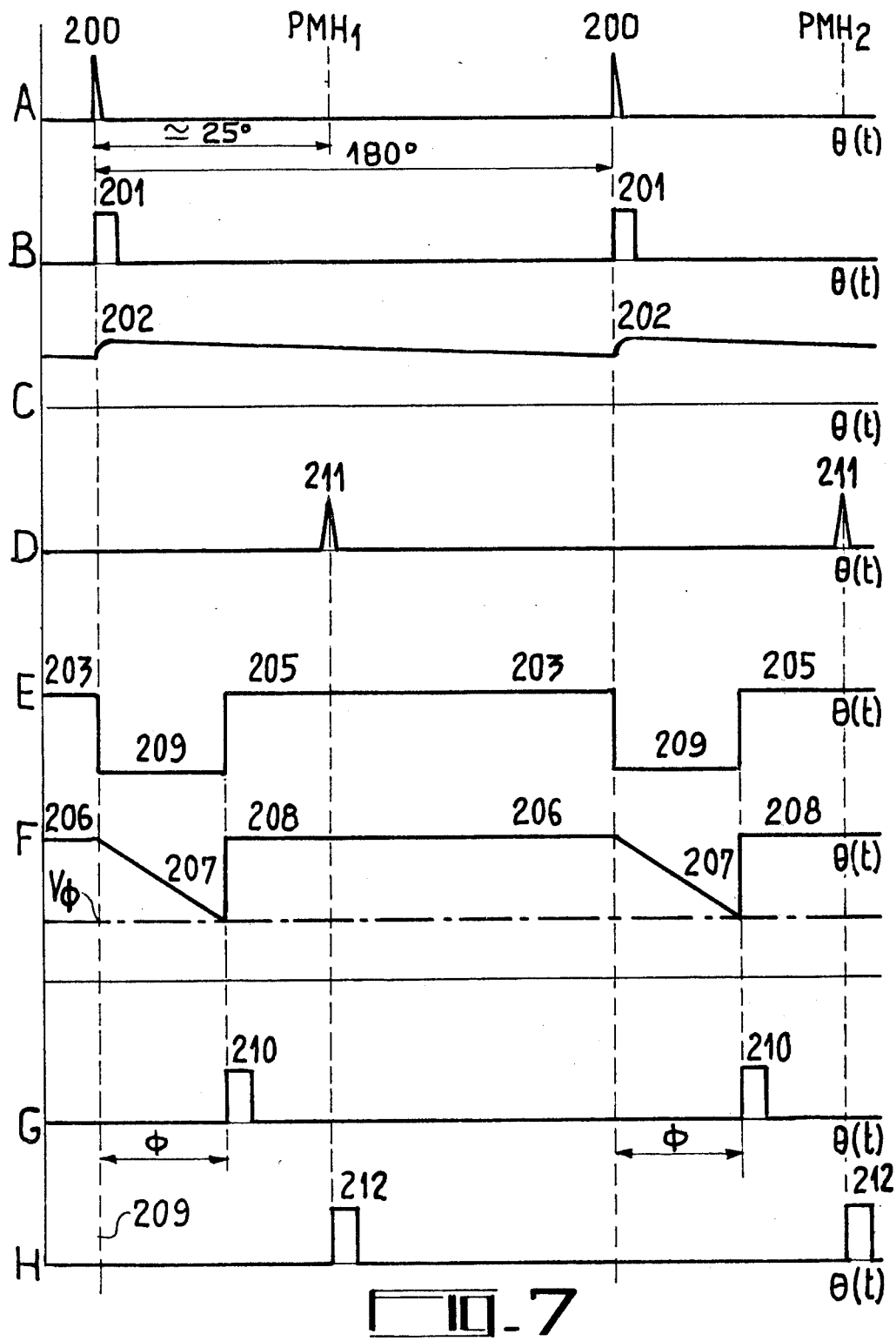

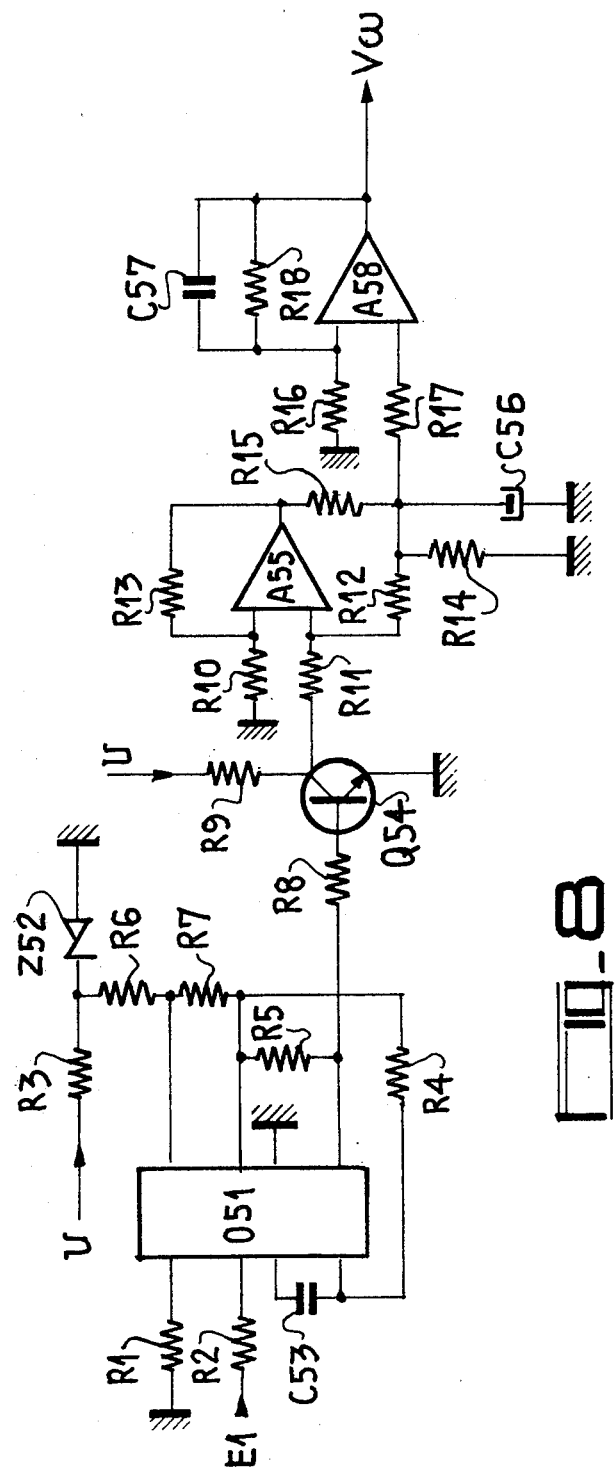
FIG_8

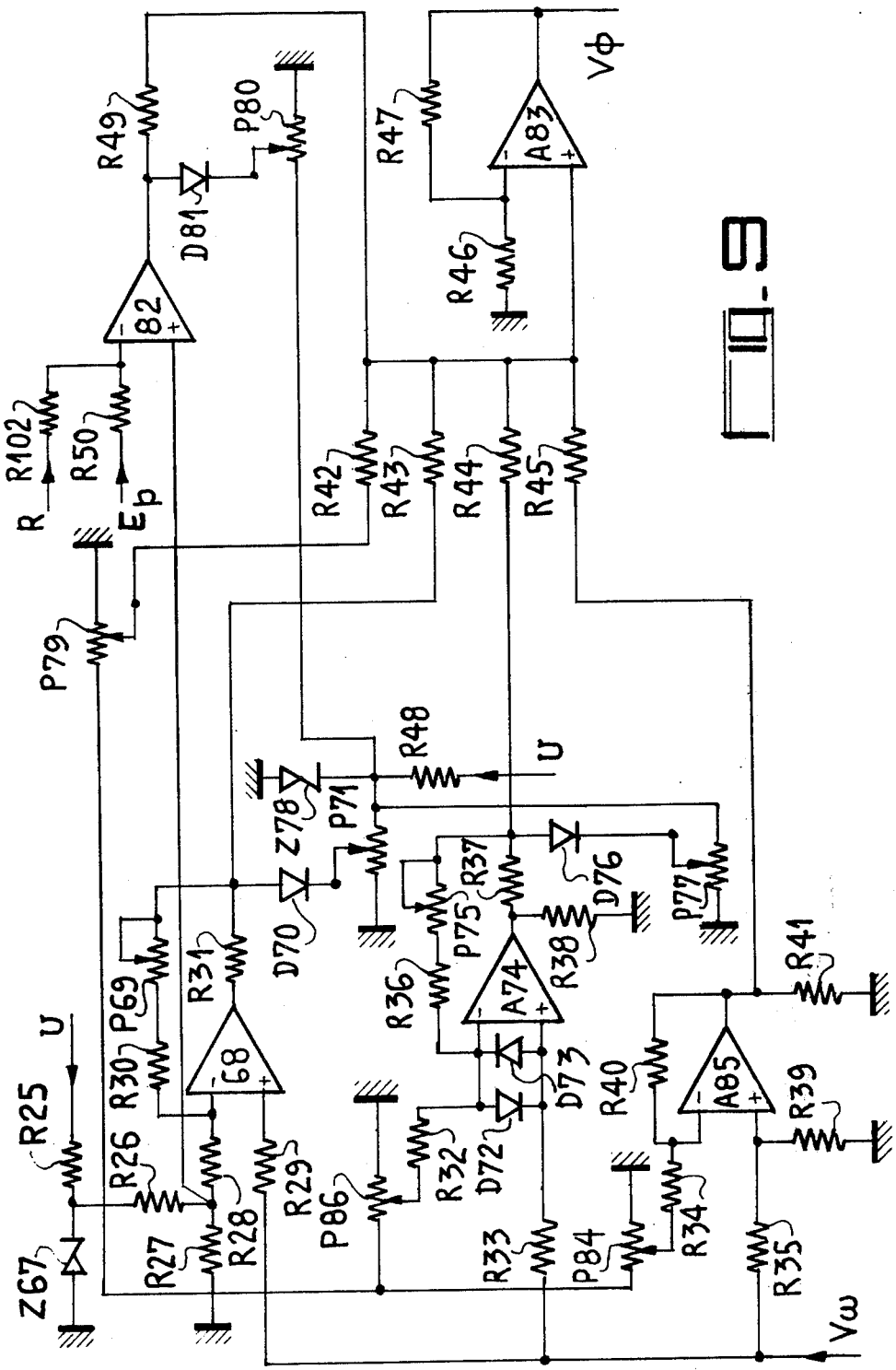

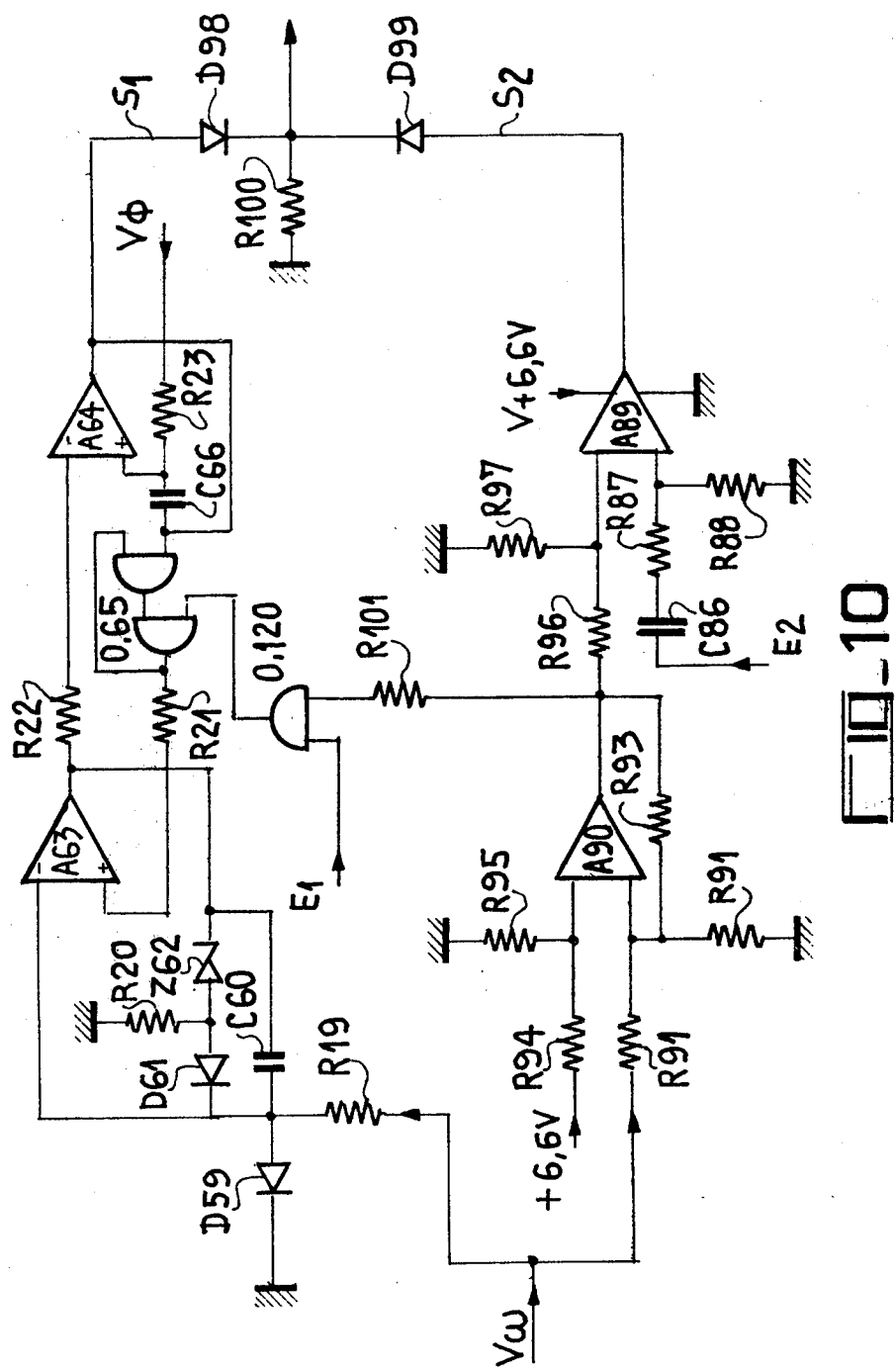
FIG_10

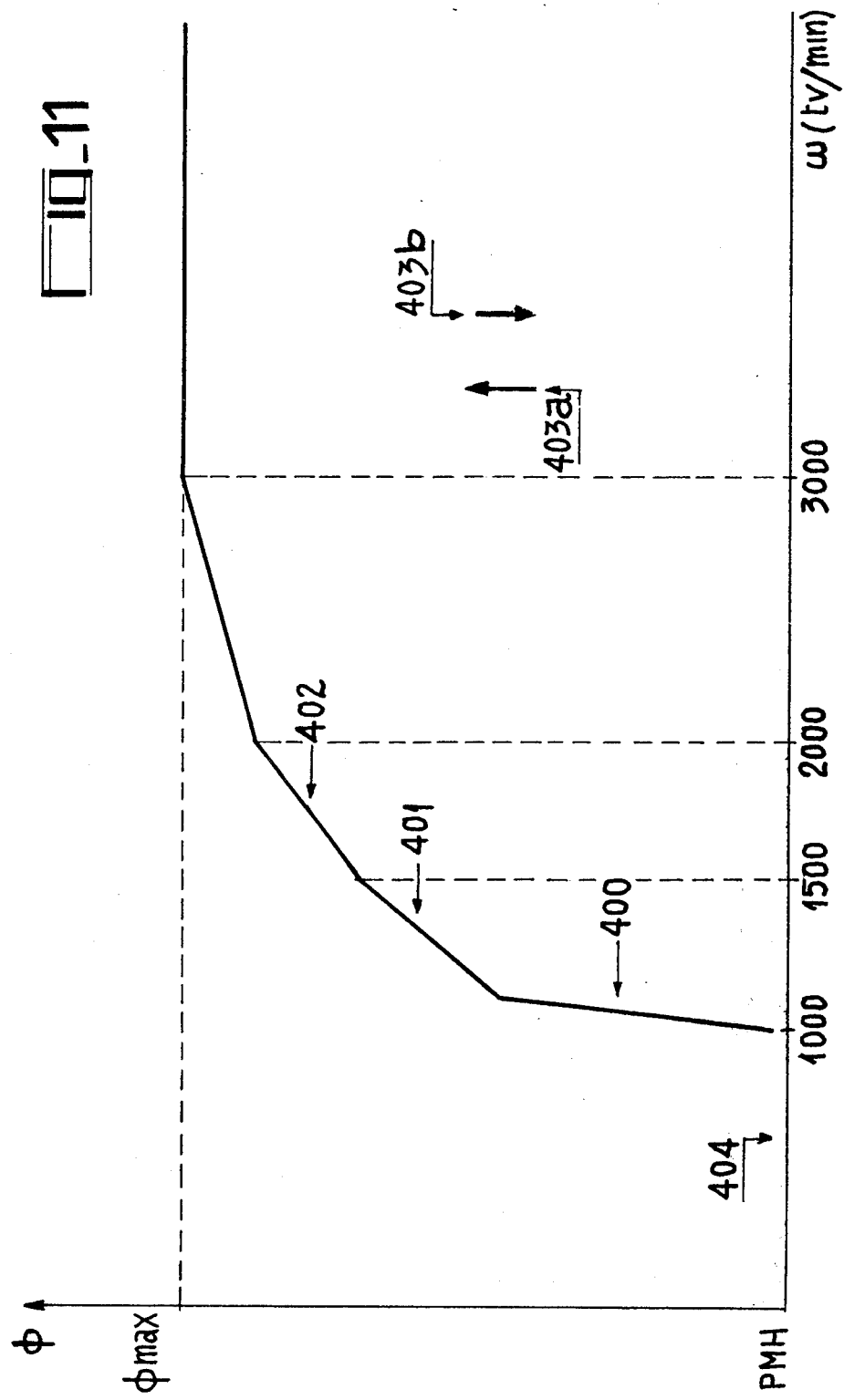

ELECTRONIC ARRANGEMENT FOR CONTROLLING THE IGNITION OF AN INTERNAL COMBUSTION ENGINE

An electronic arrangement for an internal combustion engine which is fitted on the one hand with an electronic contact breaker and on the other hand with sensors for measuring physical parameters characteristic of the conditions under which the engine is operating, the arrangement allowing the precise control of the instant at which the ignition sparks are emitted This electronic arrangement comprises two channels whose operation is mutually exclusive, namely a first channel which operates when the engine is started up and is idling and a second channel which operates when the engine is running at high speed and under load.

The arrangement is applicable to electronic ignition systems for internal combustion engines with controlled emission.

The present invention relates to electronic ignition systems for internal combustion engines with controlled emission, and more particularly to an electronic arrangement for controlling the precise instant at which the ignition sparks are triggered as a function of the operating conditions of the engine.

The ignition systems in current use as fitted to internal combustion engines, employ electromechanical components. These components are subjected to extremely severe operating stresses and, because of this, are liable to wear out quickly and frequently have to be readjusted. Moreover, such electromechanical systems are only capable of correcting the instant of ignition, as a function of the instantaneous conditions under which the engine is operating in a very approximate fashion and do not allow the specific fuel consumption to be optimised or, as is desirable, the pollution level in the gases resulting from the combustion of the fuel/air mixture to be reduced.

So that engines, and in more general terms vehicles, will provide the desired performance in terms of reliability and general running, these electromechanical systems need to be serviced and adjusted periodically and require a certain amount of preventative maintenance.

To overcome the defects and disadvantages of electromechanical systems, it has been proposed to substitute electronic components for the more fragile items, such as the mechanical contact breakers associated with the ignition coil. This substitution has given rise to a new type of device known as an "electronic contact breaker". This kind of contact breaker has been adopted in certain types of vehicle and is currently operating in a relatively satisfactory fashion. As a second stage, it has been proposed to construct entirely electronic ignition systems in which, in addition to the contact breaker being electronic, the correcting orders or advance-retard orders required to adjust to the conditions under which the engine is operating at any given time, and the corresponding angular shift of the instant of spark emission relative to the top dead centre (TDC) of the pistons, are produced by electronic circuits.

A fully electronic ignition system, that is to say one which consists of an electronic contact breaker and associated components for controlling the instant of emission of the sparks, is made up of the following elements:

a series of transducers or sensors for measuring physical parameters which are characteristic of the conditions under which the engine is operating at any given time, these being generally: speed of rotation, load and, possibly, the temperature of the engine, a synchronising sensor keyed to the cam shaft which indicates the position of the pistons along their travel, in the form of one or more synchronised electrical signals whose phases and interrelationship are generally fixed;

a member for programming advance-retard orders which, on the basis of the signals provided by the measurement sensors mentioned above, enables the optimum advance-retard order to be calculated and this order to be transmitted to:

a member for shifting the time of ignition which is capable of converting the advance-retard order into an electrical signal which triggers:

a spark generator or electronic contact breaker which, possibly via a distributor, feeds the sparking plugs located in the combustion chambers of the cylinders of the engine.

Fully electronic ignition systems already designed or currently under test have a certain number of defects, amongst which may be mentioned;

a certain sensitivity to interference signals of electronic origin and, in particular, those produced by the electronic contact breaker, misfunctioning when the engine is being started, resulting from the very high voltage drain from the electrical supply source, a performance which is sometimes poor from the point of view of accuracy, particularly when the systems have to operate with engines having a small number of cylinders.

Remedies have been found for these defects at the expense of increasing the complexity of the circuits. The first defect mentioned for example, can be corrected by using electronic screens and inserting rejection circuits at sensitive points in the circuits and at the same time by using circuits in which the signal level is high. The second defect mentioned can be remedied by adding a circuit for manual starting. The modification proposed to achieve the required accuracy consists in stabilising the circuit by adding feedback loops.

These remedies merely transform the problems into ones of production cost and reliability. The standard of reliability set by the automobile industry is of the order of 2,000 hours of trouble-free operation. It is in fact very high even though the figure of 2,000 hours may look relatively low. Also, it is known that the current technique of making an initial running test to eliminate defective electronic circuits is not applicable in mass production such as exists in the automobile industry.

Furthermore, preventative maintenance done on electronic systems is largely ineffective. In conclusion, the reliability and consistency standards of automobile electronic systems need to be intrinsic and it is this that the present invention proposes to achieve by employing means which are adapted to the various conditions under which the engine may operate, these being, on the one hand, the low-speed conditions comprising the starting and idling periods, and on the other hand, the high-speed conditions characterised by medium and high speeds of rotation, the varying load on the engine also being taken into consideration.

Another object of the invention is to provide a member for shifting the time of ignition, this being the critical item in the system, which is insensitive to the various electrical signals produced by the contact breaker.

Another object of the invention is to provide means which do not make it necessary to employ high-signal-level circuits, and which are consequently capable of operating directly from the vehicle's existing power supply.

The present invention also relates to a member for shifting the time of emission of the sparks which is formed by a phase shifter which operates in pulses and is capable of locking automatically before a spark is produced at the spark plugs. Furthermore, this member makes use of the whole of its dynamic phase-shifting and this makes it possible to achieve an intrinsically accurate performance.

Other features of the invention will become apparent in the course of the following description, which refers to the accompanying drawings, which show embodiments of the invention by way of non-limiting examples.

In the drawings:

FIG. 1 shows the ignition spark frequency of a four-stroke engine as a function of the speed of rotation of the engine, FIG. 2 is a simplified block diagram of an embodiment of the invention, FIG. 3 is a detailed block diagram of an embodiment of the calculating member, FIG. 4 shows a typical characteristic for a speed programme, FIG. 5 shows a typical characteristic for a pressure reduction programme, FIG. 6 is a detailed block diagram of an embodiment of the control member, FIG. 7 shows the waveforms delivered by the control member, FIG. 8 is a diagram of an embodiment of the circuit for calculating the speed of rotation of the engine, FIG. 9 is a circuit diagram of an embodiment of the programming for advancing the ignition timing as dictated by speed and pressure reduction, FIG. 10 is a circuit diagram of an embodiment of the control circuit, FIG. 11 shows the advance-retard characteristic of the embodiment of the invention which is described.

In all the Figures, the same reference numerals and letters refer to similar components. For the purposes of illustration, the description of the invention applies to a twin-cylinder engine but it should be understood that everything that is described is equally valid no matter what the number of cylinders with which the engine is fitted.

Before beginning a full and detailed description of the invention, certain basic facts will be reviewed.

In a four-stroke engine the frequency of the ignition sparks is given by the following formula:

$$F = N \cdot C/2.60 \text{ (Hz)}$$

in which
N is the speed of the engine in revolutions per minute,
C is the number of cylinders.

FIG. 1 shows the frequency of emission of the ignition sparks as a function of the number of revolutions N of the motor, for different values of parameter C.

The power stroke of a reciprocating piston engine takes place when the volume of the cylinder increases after the explosion. Consequently, it is necessary that the thrust resulting from the combustion of the fuel/air mixture comes into action during this phase of the cycle. To obtain the maximum power with the minimum specific fuel consumption it is necessary for the spark to be emitted at that precise moment when, allowing for inertia, perfect synchronisation can be achieved between thrust and the movement of the piston.

When the engine is being started, it is necessary to reduce the angle of advance to zero and sometimes even to retard the ignition. Any opposing force which tends to slow down the driving speed of the starter, which is typically around 50 rpm, must be avoided. In dynamic operation, the angle of advance of the ignition timing depends on a number of variables:

the speed of rotation of the engine, which takes effect principally through two parameters; namely, on the one hand, the time available to allow an adequate quantity of the mixture to be burnt is reduced when the speed of rotation of the engine increases; and, on the other hand, the speed of propagation of combustion increases with speed. These two parameters, which alter in opposite directions, do not however compensate each other. In effect, the speed of combustion, which is very low at low speeds (2 to 6 meters/second) rises above 1,000 rpm to approximately 20 meters/second and after this shows only a very slow change. A device for varying advance as a function of the speed of rotation of the engine will always be necessary to obtain satisfactory operation.

the output power which the engine develops, or the load on the engine, takes the form of a resisting force applied to the pistons. It is found that the angle of advance has to be reduced when this force increases. In many ignition systems this correction is effected from information on the pressure drop in the carburettor or the inlet manifold.

The physical laws which govern the operation of internal combustion engines are comparatively well-established and generally speaking they are non-linear, although the quantities involved vary from one design of engine to another. They can, however, be determined empirically.

FIG. 2 is a simplified block diagram of an embodiment of the invention and of the connections between it and the parts of the engine.

The electronic ignition system comprises two main sections:

(A) The engine section, which consists of the engine M proper which is fitted with an electronic contact breaker ALL and two sensors C1 and C2 which measure the physical operating parameters of the engine: The sensors are:

a rotation sensor C1 which measures the position of the pistons along their travel and delivers two synchronised signals E1 and E2 each of which is in the form of a continuous train of pulses. The phase of the pulses in the first emitted signal E1 is in advance of the TDC with the size of the angle of advance being at least equal to that of the maximum required advance. The phase of the pulses in the second emitted signal E2 corresponds substantially to the pistons passing through the TDC.

Sensor C1 is keyed to the cam shaft of the engine and consequently the repetition frequency of the two pulse trains E1 and E2 is proportional to the speed of rotation of the engine and their relative phases are fixed.

a depression sensor C2 which is connected to the inlet manifold of the engine and emits a continuous signal Ep representing the load on the engine.

The electronic contact breaker ALL may be of the coil or capacitor type and its output feeds, possibly via a distributor, spark plugs B which are fitted into the combustion chambers of the cylinders. The input of the contact breaker receives a triggering signal. Various models of electronic contact breaker are at present on the market such as the model BUX37 electronic contact breaker for a coil developed by the SESCOSEM division of the THOMSON-CSF company.

(B) The ignition-advance controlling section which consists of two main components:

a calculating member CAL which is fed with the signal E1 from the sensor C1 associated with the engine and with the signal Ep from the depression sensor C2. On the one hand, the calculating member produces from signal E1 a continuous signal $V\omega$ proportional to the speed of rotation of the engine and, on the other hand, from this signal $V\omega$ and signal Ep, an advance-retard order $V\phi$, a member CMD for controlling the instant of ignition which has two channels for triggering the electronic contact breaker ALL, namely a phase shifting channel DEPH and a transfer channel TRN, these channels being coupled to the electronic contact breaker via an OR circuit.

The phase shifting channel DEPH comes into operation when the motor is running at high speed (above 1,000 rpm) and the transfer channel comes into operation when the motor is being started and when the engine is running at a speed of less than 1,000 rpm. It is understood that the two channels are made mutually exclusive by means of a validating signal R which is supplied by the transfer channel TRN. The phase-shifting channel DEPH allows the phase of signal E1 to be shifted under the control of the signal $V\omega$ for the speed of rotation of the engine and in agreement with the advance-retard order $V\phi$, both of which are produced by the calculating member CAL. The transfer channel TRN transmits the signal E2 from rotation sensor C1 directly and automatically under the control of the signal $V\omega$ which is used to produce the validating signal R.

The electronic ignition system is powered by the electrical energy source EN with which the vehicle is fitted, without any intervening auxiliary source to raise the output voltage from source EN, which provides a nominal voltage U of the order of 12 volts.

FIG. 3 is a detailed block diagram of an embodiment of the calculating member CAL according to the invention. In this Figure, the references shown inside the individual blocks correspond to the main components shown in the circuit diagrams in FIGS. 8 and 9.

The calculating member CAL consists of:

a circuit C.V. for calculating from the speed of rotation of the engine, which contains a monostable multivibrator O.51 which receives at its input the signal E1 emitted by the rotation sensor C1 and which, from its output, emits a corresponding signal of which the level and the duration of each of whose pulses are calibrated, that is to say the power of the signal is adjusted to a standard and is proportional to the speed of rotation of the engine. This output signal is applied to an amplifier, which is connected to form a current generator and is formed by components Q.54, A.55 and A.58, and whose output, in the form of a continuous signal, is representative of the speed of rotation of the engine. This signal $V\omega$ will subsequently be used by the control member CMD to produce the validating signal R and to control the phase-shifting channel DEPH. It is also applied to:

a speed-programming circuit P.V. which consists of a series of non-linear amplifiers A.68, A.74 and A.85 which cause the advance to take place according to the prescribed law as a function of the speed of rotation of the engine. The operation of this circuit is governed by the validating signal R. As an example, a characteristic for the angular advance $\phi\omega$ as a function of the speed of rotation of the engine is given in FIG. 4.

a circuit P.C. for programming on the basis of the load on the engine is formed by a non-linear amplifier A.82 which causes the advance as a function of the load on the engine to take place according to the prescribed law. As an example, one characteristic of angular advance $\phi p$ as a function of the drop in pressure P in millibars is given in FIG. 5.

a circuit for setting the initial value of the angle of advance, which delivers a steady voltage $\phi o$ which can be adjusted by means of a potentiometer P.79 which is fed with a stabilised voltage Ust.

an adding circuit ADD which is capable of forming the algebraic sum of the three signals delivered by the foregoing circuits P.V., P.C. and P.79 and which is formed by a member A.83. The output signal $V\phi$ from this circuit represents the advance-retard order which determines the instant at which the ignition sparks are emitted during the period when the speed of the engine is higher than 1,000 rpm.

FIG. 6 is a detailed block diagram of one embodiment of the member CMD for controlling the instant of ignition. In this Figure, the references shown inside the individual blocks correspond to the main components shown in the electrical circuit diagram of FIG. 10.

This control member CMD contains two non-independent channels as described above:

a transfer channel TRN which is active while the engine is being started and is idling. This channel TRN contains a level-comparator stage A.90 which receives on the one hand, the signal $V\omega$ representing the speed of rotation $\omega$ of the engine, which is provided by the calculating member CAL and, on the other hand, a steady adjustable reference voltage Vx corresponding to the 1,000 rpm condition. Level-comparing stage A.90 emits a signal, termed the validating signal, when the speed of rotation of the engine is higher than 1,000 rpm. This latter value depends on the model of internal combustion engine concerned and the tolerance on this value is not critical. Below 1,000 rpm the polarity of the validating signal R is such that it allows the signal E2 from the rotation sensor C1 to be transmitted directly via a coincidence circuit A.89. The output signal S2, which is in phase with signal E2 forms the signal So for triggering the electronic contact breaker, which it does via a coupling circuit of the OR type formed by members D.98 and D.99.

a phase-shifting channel DEPH which is active during the periods of time when the engine is running at high speed. This channel DEPH enables the phase of the signal E1 emitted by rotation sensor C1 to be shifted. It consists of a triggerable and lockable generator for generating signals of a triangular form and is formed by a member A.63. The triangular signal is applied to one of the inputs of a level-comparing stage A.64 whose other input receives the advance-retard order signal $V\phi$ emitted by calculating member CAL. When the level of signal $V\phi$ and the instantaneous level of the triangular signals coincides, this causes stage A.64 to change over and as a consequence, via the OR circuit already mentioned, signal S1 to form the signal for triggering the electronic spark generator ALL. A fraction of signal S1 is fed back to the input of the phase-shifting channel and is applied to one of the inputs of a logic operator formed by a member O.65. The other input of this logic operator receives the signal S1 supplied by sensor C1 via an AND circuit, under the control of the validating signal R. As a result of these two operators being inserted at the input of the triangular signal generator A.63, the triangular signals are released at the times when the pulses of signal E1 appear and are interrupted when the output signal S1 from comparator A.64 appears. Since the generator A.63 for generating the triangular signals operates under the control of the signal Vω representing the speed of rotation of the engine, the slope of the triangular output signals is proportional to this speed and the instantaneous value of the triangular signals thus corresponds to the angle of the cam-shaft.

The various waveforms used or existing in control member CMD are shown in FIG. 7.

Along the abscissa is plotted the value of the angle φ(t) of the cam-shaft as a function of time. The figures shown against the waveforms are also shown in boxes on FIGS. 3 and 6.

At. 7.A is shown the waveform of the signal E1 emitted by the rotation sensor C1. In a twin-cylinder engine the angular distance between two consecutive pulses 200 is 180°. The TDC is shown as a broken line and the advance of the pulses 200 with respect to the TDC is approximately 25 degrees.

At. 7.B is shown the output signal from the operator O.51 shown in FIG. 3.

At 7.C is shown the signal Vω representing the speed of rotation ω of the engine.

At 7.D is shown is shown the waveform of the signal E2 emitted by rotation sensor C2. It is substantially in phase with the TDC and depending upon the type of engine it may be slightly (a few degrees) in front of or behind the TDC.

At 7.E is shown the waveform of the output signal from logic operator O.65.

At 7.F is shown the waveform of the triangular signals which are produced by generator A.63 in response to the voltage Vφ representing the advance-retard order.

At 7.G is shown the output signal S1 from comparator A.64.

At 7.H is shown the output signal S2 from transfer circuit A.89.

An embodiment of the various means described above, which constitute the invention, will now be described in detail. To simplify the description, the prefixes R, C, D, Z, Q, A, O and P of the referenced components correspond respectively to resistor, capacitor, diode, Zener diode, transistor, amplifier, operator and potentiometer.

FIG. 8 is a circuit diagram of a particular embodiment of the circuit for calculating the speed of rotation of the engine. The references of the marked components correspond to the references entered in FIG. 3.

The circuit for calculating the speed of rotation of the engine includes a commercially available integrated circuit O.51 which forms part of the monostable multivibrator. In the embodiment being described it is an integrated-circuit component marketed by "MOTOROLA" under identity number 145.28.AL which is normally used to produce operators of the multivibrator kind. Operator O.51 has associated with it components R3 and Z.52 which form the voltage stabiliser for stabilising the supply voltage U to the operator, with components R.6, R.7 and R.1 setting the energy reference levels for the operator. The signals from O.51 are relayed by a low-power NPN transistor Q.54 of the 2N2222 type whose collector load is an associated component R.9. The output signals from Q.54 are fed to an operational amplifier A.55 of the TDE.0124.DP type marketed by the SESCOSEM Division of THOMSON-CSF. Components R.11 and R.12 determine the feedback gain and components R.14, R.15 and C.56 form the energy store of the current generator. The voltage across the terminals of C.56 is applied to a follower stage formed by an integrated-circuit amplifier of the TDE.0124.DP type marketed by the SESCOSEM Division of THOMSON-CSF, with components R.17, R.18, R.16 and C.57 forming the circuit components associated with the amplifier. The output signal Vω is representative of the speed of rotation of the engine.

FIG. 9 is a circuit diagram of an embodiment of the programming circuits which operate as a function of the speed of rotation of the engine and the load on it. The references allotted to the components correspond to the references marked in FIG. 1.

The programming circuit which operates as a function of the speed of rotation of the engine includes an amplifier A.68 with which are associated setting components R.25, R.26, R.27, R.28 and Z.67, which determine the operating point of amplifier A.68. The limiting circuit at the output of amplifier A.68 is formed by components D.70, P.71, Z.78 and R.48. An amplifier A.74 has setting components R.32 and P.86 which determine its operating point and the voltage limiting circuit at the output of the amplifier is formed by components R.38, D.76 and P.77. A peak-clipping circuit is connected at its input end and is formed by components D.72 and D.73. An amplifier A.85 has components R.34, P.84 which determine its operating point. Components R.35, R.31 and R.40 determine the gain of the amplifier and component R.41 forms its load impedance.

The programming circuit which operates as a function of the load on the engine includes an amplifier A.82 which determines the characteristic of the advance and retard in response to pressure drop and this amplifier has associated with it setting components P.80 and D.81 which form a peak clipping circuit. The positive input of amplifier A.82 is biassed by components R.25, R.26 and R.27 and its negative input receives, on the one hand, the output voltage Ep from the depression sensor C.2 and, on the other hand, the validating signal R supplied by the transfer channel TRN.

Amplifier A.83 enables a weighted algebraic sum to be formed from the output signals resulting from programming the speed of rotation of the engine and the load on it, this summing operation taking place via components R.43, R.44, R.45 and R.49. The potentiometer P.79 enables, via component R.42, the initial reference level for the advance-retard order Vφ available at the output from summing amplifier A.83 to be adjusted.

FIG. 10 is a circuit diagram of an embodiment according to the invention of the control member CMD. The references allotted to the components shown correspond to the references in FIG. 6.

The transfer channel contains a level-comparator stage followed by a coincidence stage or gate. The comparator stage formed by amplifier A.90 is fed on the one hand with the signal Vω representing the speed of rotation of the engine and on the other hand with a steady voltage Vx which corresponds to the threshold of the high-speed condition of rotation of the engine (approximately 1,000 rpm) and which can be adjusted by R.94 and R.95.

When the speed of rotation of the engine is lower than the threshold value Vx, stage A.90 emits a signal which allows the coincidence stage A.89 to be activated.

When the speed of rotation of the engine exceeds the speed threshold Vx, stage A.90 emits a validating signal R which, on the one hand, deactivates A.89 and, on the other hand, validates the phase-shifting channel DEPH and the speed-responsive programmer A.82 (FIGS. 3 and 9).

Stage A.89 receives, on the one hand, the validating signal R from the common point of components R.96 and R.97 and, on the other hand, signal E2 from rotation sensor C1. When the validating signal R is not present, signal E2 is transmitted, in the form of signal S2, directly to the input of component D.99, with no phase shift.

The phase shifting circuit consists of a generator A.63 which generates signals of triangular shape, a comparator stage A.64, and auxiliary logic circuits O.65 and O.120.

The signal Vω representing the speed of rotation of the engine is fed to one of the inputs of generator A.63, which is of the "Miller Integrator" type with provision for resetting to an initial level.

The output signal Us is of the form $$Us = Uo - \frac{1}{RC}\int_{o}^{t} Ue\, dt$$

in which

Uo is the initial integration condition fixed by components Z.62 and R.20 and the integration is performed in response to a logic signal emitted by operator O.65 which is fed to the other input via component R.21.

Ue is the voltage represented by Vω, the signal representing the speed of rotation of the engine.

1/RC is the setting constant represented by components C.60 and R.19.

Generator A.63 thus emits a decreasing voltage whose rate of decrease is a function of the initial condition and of the continuous voltage representing the speed of rotation of the engine. The triangular signals are fed to one of the inputs of level comparator A.64, which also receives, via component R.23, the advance-retard order signal Vφ which comes from the speed-responsive programmer P.V. and load-responsive programmer P.C. after their signals have been added by summing stage A.83. The result is that whether or not the comparator changes over depends upon the coincidence of the instantaneous level of the triangular signal emitted by A.63 and the level of the advance-retard order signal Vφ produced by order calculator CAL. Component C.66 acts as a differentiator for the output signal from A.64, a fraction of which is tapped off and applied to logic operator O.65.

Logic operator O.65, which is of the bistable flip-flop type, sets the conditions governing the coming into operation of the triangular-signal generator A.63.

Logic operator O.120, which is of the AND type allows the input signals E1 from rotation sensor C1 to be validated when the validating signal R emitted by stage A.89 in the transfer circuit is present.

The diagram of FIG. 11 shows a typical example of an advance-retard characteristic as a function of speed of engine rotation ω and pressure drop p in the engine.

Part 404 of the graph corresponds to a fixed amount of advance or retard, or none of either, being applied by transfer channel TRN, and the remainder of the graph represents a varying amount of advance which is applied by the phase-shifting channel DEPH, the advance being caused by A.68 at 400, by A.74 at 401 and by A.85 at 402. The overall shifts 403a and 403b are brought about by A.82, which is the operator which advances and retards in response to reductions in pressure.

The advantages which the electronic arrangement just described provides in comparison with the prior art are important in several respects.

The use of two channels which operate automatically and in a mutually exclusive fashion makes it possible to trigger the ignition sparks at precise instants during the starting up and idling phases of the engine and in particular the abrupt drop in the voltage from the main electrical supply source, which is caused by the operation of the starter, does not upset the timing of these instants. The phase-shifting circuit operates with only a low-speed dynamic, of the order of 1,000 to 6,000 rpm.

The phase-shifting circuit is produced in such a way that its dynamic variation is matched to the range of adjustment of the advance-retard angle, which means that its performance is inherently accurate. What is more, the fact that it is always reset to the original conditions before a spark is emitted makes it insensitive to interference signals generated by the electronic contact breaker.

The design of the arrangement according to the invention enables the electrical energy source to be used directly with no intervening auxiliary source. Other advantages which are gained by using the arrangement in an electronic ignition system for internal combustion engines with controlled emission are that specific fuel consumption is reduced, pinking phenomena cease to appear and the pollution level in the combustion gases from the cylinders is considerably reduced.

I claim:

1. An electronic ignition system for an internal combustion engine which comprises:
    means for generating a train of high-voltage sparks to ignite the air/fuel mixture introduced into the cylinders of said engine; and
    means, responsive to a d.c. control signal, for triggering said spark generating means such that each spark therefrom occurs at a predetermined instant of time, said triggering means comprising:
    a first transducer, coupled to said engine, for generating first and second pulse trains each proportional to the rotational speed of said engine and having a fixed phase relationship to the other and to the position of the pistons with respect to top dead center;
    a frequency-to-voltage converter, receiving as its input the first pulse train from said first transducer, for generating a d.c. output signal which is proportional to the rotational speed of said engine;
    an OR-gate having a first input connected to the first pulse train from said first tranducer and a second input;
    an integrating circuit having a first input connected to the output of said OR-gate and a second input for receiving the d.c. output signal from said frequency-to-voltage converter, said integrating circuit generating a wave having a periodic, triangularly-shaped portion, the slope of said triangularly-shaped portion being controlled by the d.c. output signal from said frequency-to-voltage converter and triggered by said first pulse train from said first transducer; and a comparison circuit having a first input connected to the output of said integrating circuit and a second input connected to the source of said d.c. control signal, said comparison circuit generating an output signal whenever the instantaneous value of said traingularly-shaped wave equals the value of said d.c. control signal, the output of said comparison circuit triggering said spark generating means and also serving to reset said triangularly-shaped wave generating means via the second input to said OR-gate.

2. The electronic ignition system according to claim 1 wherein said integrating circuit comprises a Miller integrator.

3. An electronic ignition system for an internal combustion engine, said ignition system permitting exact control of the timing of the ignition spark, which comprises:

means for generating a train of high-voltage sparks to ignite the air/fuel mixture introduced into the cylinders of said engine;

a transducer functionally connected to said engine for generating first and second synchronized pulse trains, said first pulse train being offset by a predetermined angle from top dead center, said second train being aligned with top dead center;

a frequency-to-voltage converter having an input connected to said transducer, the output therefrom being a d.c. signal which is proportional to the engine's r.p.m.;

a first control channel, activated during the cruising stage of said engine, said control channel varying the phase of the first pulse train in proportion to both rpm and engine load;

a second control channel, used during the start-up and idle modes of said engine, which directly transfers the second pulse train to said spark generating means;

electronic means for activating said first and second control channels in a mutually exclusive way, said means comprising:

a voltage comparator having first and second inputs respectively connected to the output of said frequency-to-voltage converter and to source of reference signal (Vx), the magnitude of which represents the crossover point between low and high engine speeds; and an OR-gate with two inputs, one connected to said first control channel, the second connected, via said comparator, to said second control channel, the output thereof being connected to said spark generating means.

4. An electronic control device according to claim 3 wherein said first control channel includes means for varying the phase of said first pulse train in accordance with the rpm and the engine load, said means comprising:

a triangle wave generator which receives the output from the frequency-to-voltage converter and which is triggered and reset by a square wave;

a voltage comparator having two inputs, the first being connected to the output of said triangle-wave generator, and the second receiving a d.c. control signal which is proportional to the r.p.m. and engine load; and a bistable multivibrator which is tripped by the input signals to, and reset by the output signals from, said voltage comparator and which delivers the square wave output signal which is delivered to said triangle-wave generator.

5. An electronic control device according to claim 4, wherein said triangle-wave generator comprises a Miller integrator.